US011184665B2

(12) United States Patent
Stockhammer et al.

(10) Patent No.: US 11,184,665 B2
(45) Date of Patent: Nov. 23, 2021

(54) INITIALIZATION SET FOR NETWORK STREAMING OF MEDIA DATA

(71) Applicant: QUALCOMM Incorporated, San Diego, CA (US)

(72) Inventors: Thomas Stockhammer, Bergen (DE); Nikolai Konrad Leung, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 16/591,097

(22) Filed: Oct. 2, 2019

(65) Prior Publication Data

US 2020/0112761 A1     Apr. 9, 2020

Related U.S. Application Data

(60) Provisional application No. 62/740,795, filed on Oct. 3, 2018.

(51) Int. Cl.
*H04N 21/435* (2011.01)
*H04N 21/2387* (2011.01)
(Continued)

(52) U.S. Cl.
CPC ....... *H04N 21/435* (2013.01); *H04N 21/2387* (2013.01); *H04N 21/440245* (2013.01); *H04N 21/440281* (2013.01); *H04N 21/8586* (2013.01)

(58) Field of Classification Search
CPC ............. H04N 21/435; H04N 21/2387; H04N 21/440281; H04N 21/440245;
(Continued)

(56) References Cited

U.S. PATENT DOCUMENTS 5,822,537 A   10/1998   Katseff et al.
7,346,005 B1   3/2008   Dowdal
(Continued)

FOREIGN PATENT DOCUMENTS

EP    3416396 A1    12/2018
GB    2516112 A     1/2015
(Continued)

OTHER PUBLICATIONS

T. Stockhammer and I. Sodagar, "MPEG DASH: The Enabler Standard for Video Delivery over the Internet," in SMPTE Motion Imaging Journal, vol. 121, No. 5, pp. 40-46, Jul. 2012, doi: 10.5594/j18188. (Year: 2012).*

(Continued)

*Primary Examiner* — Cynthia M Fogg
(74) *Attorney, Agent, or Firm* — Shumaker & Sieffert, P.A.

(57) ABSTRACT

A device for retrieving media data includes a memory configured to store media data of a media presentation; and one or more processors implemented in circuitry and configured to: retrieve a manifest file for the media presentation, the manifest file including data for an initialization set, the initialization set including initialization parameters for the full duration of the media presentation; initializing playback of the media data of the media presentation using the initialization set; retrieving the media data of the media presentation; and present the media data according to the initialized playback. For example, the initialization parameters may specify a maximum width or a maximum height of pictures of the media presentation or a maximum frame rate of the media presentation. Thus, the processors can process pictures of any size less than or equal to the maximum width/height, or media data equal to or less than the maximum frame rate.

39 Claims, 9 Drawing Sheets

(51) Int. Cl.
  *H04N 21/4402* (2011.01)
  *H04N 21/858* (2011.01)
(58) Field of Classification Search
  CPC ....... H04N 21/8586; H04N 21/234381; H04N 21/23439; H04N 21/2356; H04N 21/8456; H04N 21/2662; H04N 21/2402; H04N 21/44245; H04N 21/64738; H04N 21/6547; H04N 21/2343; H04N 21/26258; H04N 21/85406; H04N 21/44209; H04N 21/234309
  USPC .......................................................... 725/100
  See application file for complete search history.

(56) References Cited

U.S. PATENT DOCUMENTS

| | | | |
|---|---|---|---|
| 10,432,690 | B1* | 10/2019 | Li .................... H04L 65/607 |
| 2002/0052967 | A1 | 5/2002 | Goldhor et al. |
| 2007/0204056 | A1 | 8/2007 | Deshpande |
| 2011/0116772 | A1 | 5/2011 | Kwon et al. |
| 2012/0233345 | A1 | 9/2012 | Hannuksela |
| 2013/0279879 | A1 | 10/2013 | Watanabe et al. |
| 2013/0308794 | A1 | 11/2013 | Jochim et al. |
| 2014/0323036 | A1 | 10/2014 | Daley et al. |
| 2015/0269629 | A1 | 9/2015 | Lo et al. |
| 2015/0334153 | A1 | 11/2015 | Koster et al. |
| 2016/0198012 | A1* | 7/2016 | Fablet .................... H04L 67/02 709/231 |
| 2017/0188062 | A1 | 6/2017 | Oh et al. |
| 2019/0014358 | A1* | 1/2019 | Takabayashi ........... H04L 69/22 |
| 2020/0021867 | A1* | 1/2020 | Park ................ H04N 21/23605 |
| 2020/0092342 | A1* | 3/2020 | Schmelcher ....... H04N 21/2187 |
| 2020/0112753 | A1 | 4/2020 | Stockhammer et al. |
| 2020/0228586 | A1* | 7/2020 | Skupin ............... H04N 21/8455 |
| 2020/0411021 | A1* | 12/2020 | Hamada ................. H04L 67/06 |

FOREIGN PATENT DOCUMENTS

| | | | |
|---|---|---|---|
| WO | 2017138387 | A1 | 8/2017 |
| WO | WO-2017169890 | A1 * | 10/2017 ........... G10L 19/022 |

OTHER PUBLICATIONS

Weil, Nicolas, "The State of MPEG-DASH 2016" in Streaming Media, Mar. 29, 2016 (Year: 2016).*

Fielding R., et al., "Hypertext Transfer Protocol—HTTP/1.1", Network Working Group, Request for Comments, RFC 2616, Jun. 1999, 114 Pages.

Freed N., et al., "Media Type Specifications and Registration Procedures", Internet Engineering Task Force (IETF), RFC 6838, Nov. 5, 2019, pp. 1-33.

"Guidelines for Implementations: DASH-IF Interoperability Points," Version 4.0, DASH Industry Forum, Dec. 12, 2016, 168 pages.

ISO/IEC FDIS 23009-1:2019(E): "Information technology—Dynamic Adaptive Streaming Over HTTP (DASH)—Part 1: Media Presentation Description and Segment Formats", Aug. 2019, 295 Pages.

ITU-T H.265, "Series H: Audiovisual and Multimedia Systems, Infrastructure of audiovisual services—Coding of moving video, High efficiency video coding," The International Telecommunication Union. Dec. 2016, 664 pp.

"Media Source Extensions™", Nov. 5, 2019, pp. 1-78, Retrieved from the Internet: https://www.w3.org/TR/media-source/#dom-mediasource-addsourcebuffer.

Paila T., et al., "FLUTE-File Delivery over Unidirectional Transport," Network Working Group, RFC 6726, Nov. 2012, 46 Pages, Retrieved from the Internet http://tools.ietf.org/html/rfc6726.

U.S. Appl. No. 16/591,073, filed Oct. 2, 2019, 45 pages.

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 27 Pages, JVET-A1001.

Waller S., "DASH-IF CR-Low-Latency-Live-v0.3.3", DVB, Digital Video Broadcasting, C/O EBU—17A Ancienne Route—CH-1218 Grand Saconnex, Geneva—Switzerland, Sep. 10, 2018 (Sep. 10. 2018), XP017856101, 17 Pages, Retrieved from the Internet: URL:https://www.dvb.org/resources/restricted/members/documents/TM-IPI/TM-IPI3412_DASH-IF-CR-Low-Latency- . . . [retrieved on Sep. 10, 2018], p. 1, paragraph 4.x.1—p. 6, paragraph 4.x.3.3, p. 10, paragraph 4.x.4.3, p. 15, paragraph 4.x.5.

"Digital Video Broadcasting (DVB); MPEG-DASH Profile for Transport of ISO BMFF Based DVB Services over IP Based Networks", ETSI Technical Specification, European Telecommunications Standards Institute (ETSI), 650, Route Des Lucioles; F-06921 Sophia-Antipolis ; France, vol. Broadcas, No. V1.2.1, Mar. 29, 2018, XP014319318, pp. 1-113, Retrieved from the Internet: URL:http://www.etsi.org/delivertetsi_ts/103200_103299/103285/01.02.01_60/ts_103285v010201p.pdf [retrieved on Mar. 29, 2018].

International Search Report and Written Opinion—PCT/US2019/054529—ISA/EPO—dated Jan. 7, 2020.

International Standard., "Information Technology—Dynamic Adaptive Streaming over HTTP (DASH)—Part 1: Media Presentation Description and Segment Formats", MPEG Meeting; Jan. 16, 2017-Jan. 20, 2017; Geneva; (Motion Picture Expert Group or ISO/IEC JTC1/SC29/WG11), No. N16666, ISO/IEC 23009-1, Third Edition, XP030023329, Mar. 28, 2017, pp. 1-208.

Qualcomm Incorporated: "DASH Service Description", ISO/IEC JTC1/SC29/WG11 MPEG2018/M44861, Oct. 2018, Macao, CN, 7 pages.

Universal Mobile Telecommunications System (UMTS); LTE; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route Des Lucioles; F-06921 Sophia-Antipolis; France, vol. 3GPP SA, No. V9.3.0, Jun. 1, 2010 (Jun. 1, 2010), XP014047290, pp. 1-178.

\* cited by examiner

INITIALIZATION SET FOR NETWORK STREAMING OF MEDIA DATA

This application claims the benefit of U.S. Provisional Application No. 62/740,795, filed Oct. 3, 2018, the entire contents of which are hereby incorporated by reference.

TECHNICAL FIELD

This disclosure relates to storage and transport of encoded media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for signaling parameters of a media presentation. The parameters may be included in an initialization set, which may identify an initialization segment. The initialization set may define parameters that will not be exceeded for the entire duration of the media presentation. In this manner, a client device may retrieve the data of the initialization set once, and initialize various processes or environments (such as decryption, decoding, and rendering) using the data of the initialization set, without repeatedly retrieving the initialization set and/or reinitializing these processes or environments during playback of media data for the media presentation. In this manner, these techniques may improve the field of media streaming, in that these techniques may reduce processing cycles associated with initialization and thereby reduce latency associated with presenting media data of the media presentation.

In one example, a method of retrieving media data includes retrieving a manifest file for a media presentation, the manifest file including data for an initialization set, the initialization set including initialization parameters for the full duration of the media presentation; initializing playback of media data of the media presentation using the initialization set; retrieving the media data of the media presentation; and presenting the media data according to the initialized playback.

In another example, a device for retrieving media data includes a memory configured to store media data of a media presentation; and one or more processors implemented in circuitry and configured to: retrieve a manifest file for the media presentation, the manifest file including data for an initialization set, the initialization set including initialization parameters for the full duration of the media presentation; initialize playback of the media data of the media presentation using the initialization set; retrieve the media data of the media presentation; and present the media data according to the initialized playback.

In another example, a computer-readable storage medium has stored thereon instructions that, when executed, cause a processor to: retrieve a manifest file for a media presentation, the manifest file including data for an initialization set, the initialization set including initialization parameters for the full duration of the media presentation; initialize playback of media data of the media presentation using the initialization set; retrieve the media data of the media presentation; and present the media data according to the initialized playback.

In another example, a device for retrieving media data includes means for retrieving a manifest file for a media presentation, the manifest file including data for an initialization set, the initialization set including initialization parameters for the full duration of the media presentation; means for initializing playback of media data of the media presentation using the initialization set; means for retrieving the media data of the media presentation; and means for presenting the media data according to the initialized playback.

In another example, a method of sending media data includes sending a manifest file for a media presentation to a client device, the manifest file including data for an initialization set, the initialization set including initialization parameters for the full duration of the media presentation; receiving a request for media data of the media presentation from the client device; and sending the requested media data to the client device.

In another example, a device for sending media data includes a memory for storing media data of a media presentation; and one or more processors implemented in circuitry and configured to: send a manifest file for the media presentation to a client device, the manifest file including data for an initialization set, the initialization set including initialization parameters for the full duration of the media presentation; receive a request for media data of the media presentation from the client device; and send the requested media data to the client device.

In another example, a computer-readable storage medium has stored thereon instructions that, when executed, cause a processor to: send a manifest file for a media presentation to a client device, the manifest file including data for an initialization set, the initialization set including initialization parameters for the full duration of the media presentation; receive a request for media data of the media presentation from the client device; and send the requested media data to the client device.

In another example, a device for sending media data includes means for sending a manifest file for a media presentation to a client device, the manifest file including data for an initialization set, the initialization set including initialization parameters for the full duration of the media presentation; means for receiving a request for media data of the media presentation from the client device; and means for sending the requested media data to the client device.

The details of one or more examples are set forth in the accompanying drawings and the description below. Other features, objects, and advantages will be apparent from the description and drawings, and from the claims.

DETAILED DESCRIPTION

Figure 1:
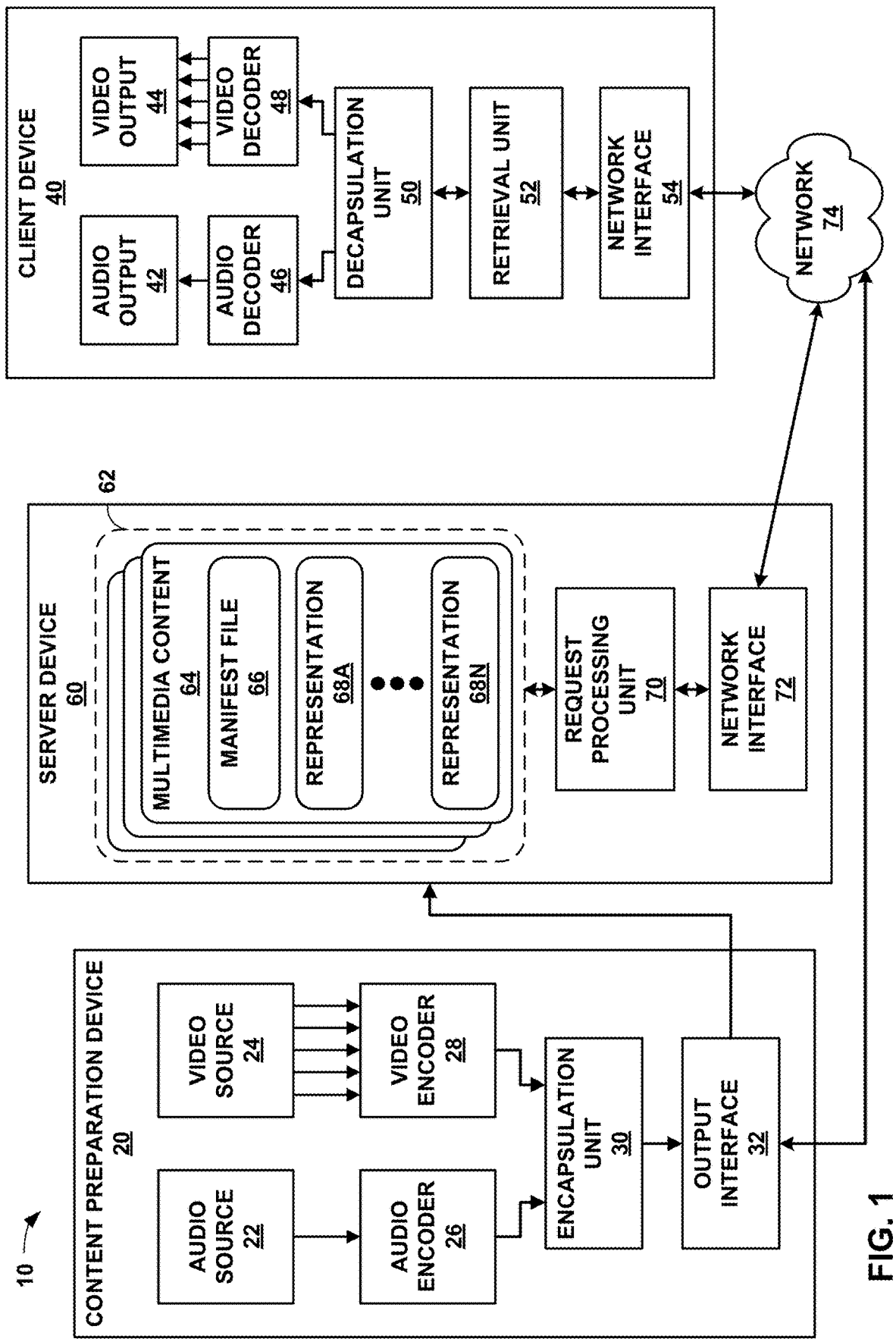
FIG. 1 is a block diagram illustrating an example system that implements techniques for streaming media data over a network according to the techniques of this disclosure.

In general, this disclosure describes techniques for transmitting initialization parameters using, e.g., an initialization set. The initialization set may specify a suitable initialization for one or more media types for a media presentation. Periods of the media presentation should therefore include at least one adaptation set that can be played when initialized using the initialization set.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network according to the techniques of this disclosure. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile idc (profile indicator) value, while a level may be signaled with a level idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Content preparation device 20 may determine various maximum or unchanging parameters of a media presentation (e.g., multimedia content 64) among representations 68 and/or adaptation sets of the media presentation. For example, content preparation device 20 may determine a maximum width and a maximum height of pictures for the media presentation across representations 68 and/or adaptation sets. As another example, content preparation device 20 may determine a maximum frame rate for video across representations 68 and/or adaptation sets. Content preparation device 20 may construct initialization segments for each type of media data (e.g., video, audio, timed text, or the like), such that data of the initializations segments can be used to initialize all of representations 68 of the media presentation according to the determined maximum values (width, height, frame rate, etc.)

In this manner, client device 40 may initialize playback of the media presentation using an initialization segment once, and then be able to perform playback of media data of any representation from any adaptation set thereafter, without reinitializing.

Content preparation device 20 may further signal data identifying the initialization segments in manifest file 66. For example, content preparation device 20 may construct manifest file 66 to include an initialization set that signals the various initialization parameters (e.g., maximum width, maximum height, maximum frame rate, etc.) as well as uniform resource locators (URLs) of the initialization segments.

Thus, client device 40 may retrieve manifest file 66, determine locations of the initialization segments, retrieve the initialization segments, and then initialize playback of media data of the media presentation (e.g., multimedia content 64). Client device 40 may then retrieve media data of any of representations 68 and perform playback of the media data without reinitialization. For example, representation 68A may have pictures having the specified maximum width and maximum height, and/or may have the maximum frame rate. Representation 68N may have pictures that are less than the specified maximum width and maximum height, and/or may have less than the maximum frame rate. Client device 40 may retrieve (and server device 60 and/or content preparation device 20 may send) media data of representation 68A for a first playback time and media data of representation 68N for a second, different playback time. Nevertheless, client device 40 may perform playback of both sets of media data (i.e., from both representation 68A and representation 68N) without performing reinitialization.

In this manner, client device 40 represents an example of a device for retrieving media data including a memory configured to store media data of a media presentation; and one or more processors implemented in circuitry and configured to: retrieve a manifest file for the media presentation, the manifest file including data for an initialization set, the initialization set including initialization parameters for the full duration of the media presentation; initialize playback of the media data of the media presentation using the initialization set; retrieve the media data of the media presentation; and present the media data according to the initialized playback.

Likewise, content preparation device 20 and server device 60 represent examples of a device for sending media data including a memory for storing media data of a media presentation; and one or more processors implemented in circuitry and configured to: send a manifest file for the media presentation to a client device, the manifest file including data for an initialization set, the initialization set including initialization parameters for the full duration of the media presentation; receive a request for media data of the media presentation from the client device; and send the requested media data to the client device.

Figure 2:
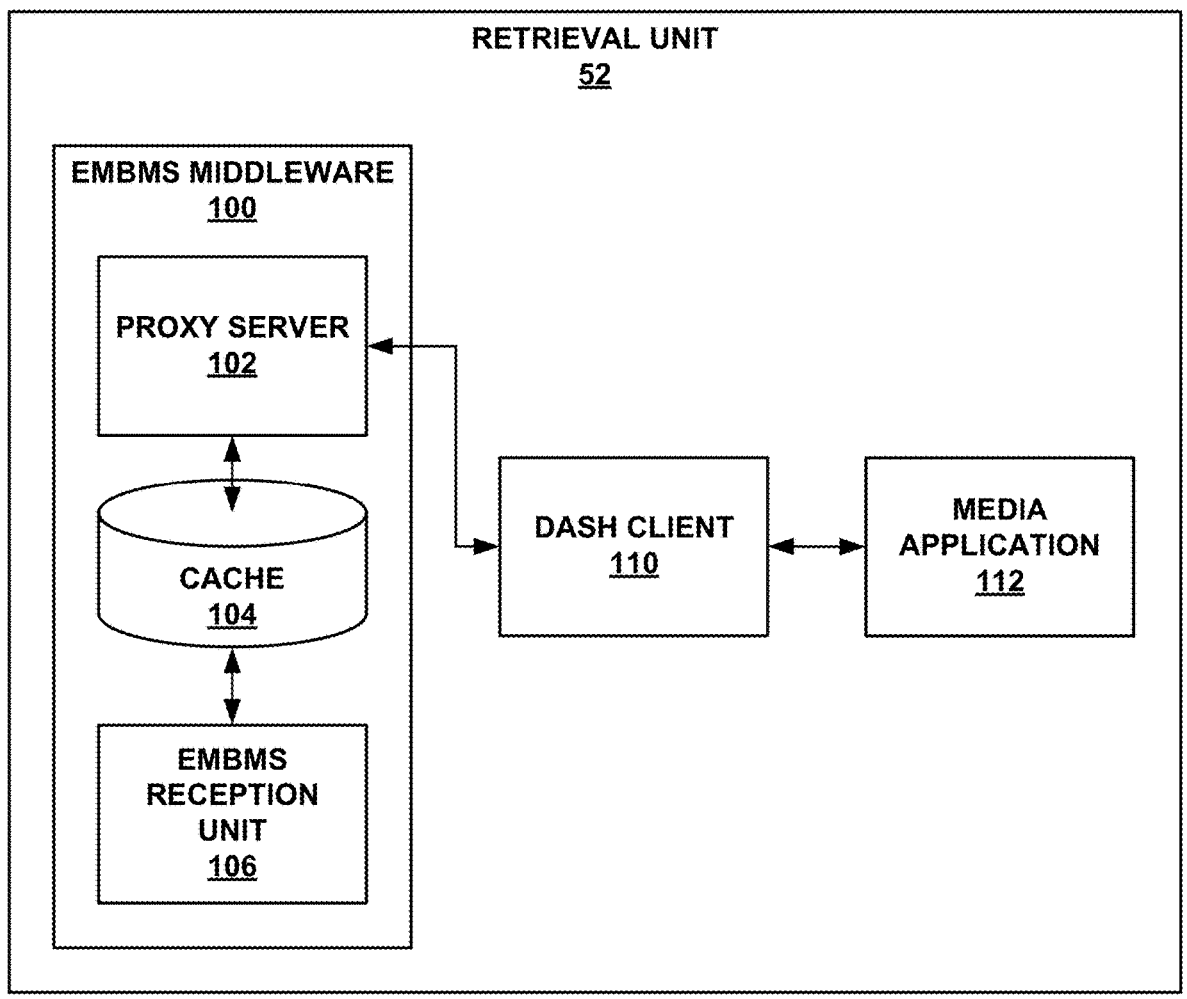
FIG. 2 is a block diagram illustrating an example set of components of a retrieval unit.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, Nov. 2012, available at tools.ietf.org/html/rfc6726. That is, eMBMS reception unit 106 may receive files via broadcast from, e.g., server device 60, which may act as a broadcast/multicast service center (BM-SC).

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server unit 102. Proxy server unit 102 may retrieve requested data from cache 104 and provide the data to DASH client 110 in response to such requests.

Figure 3:
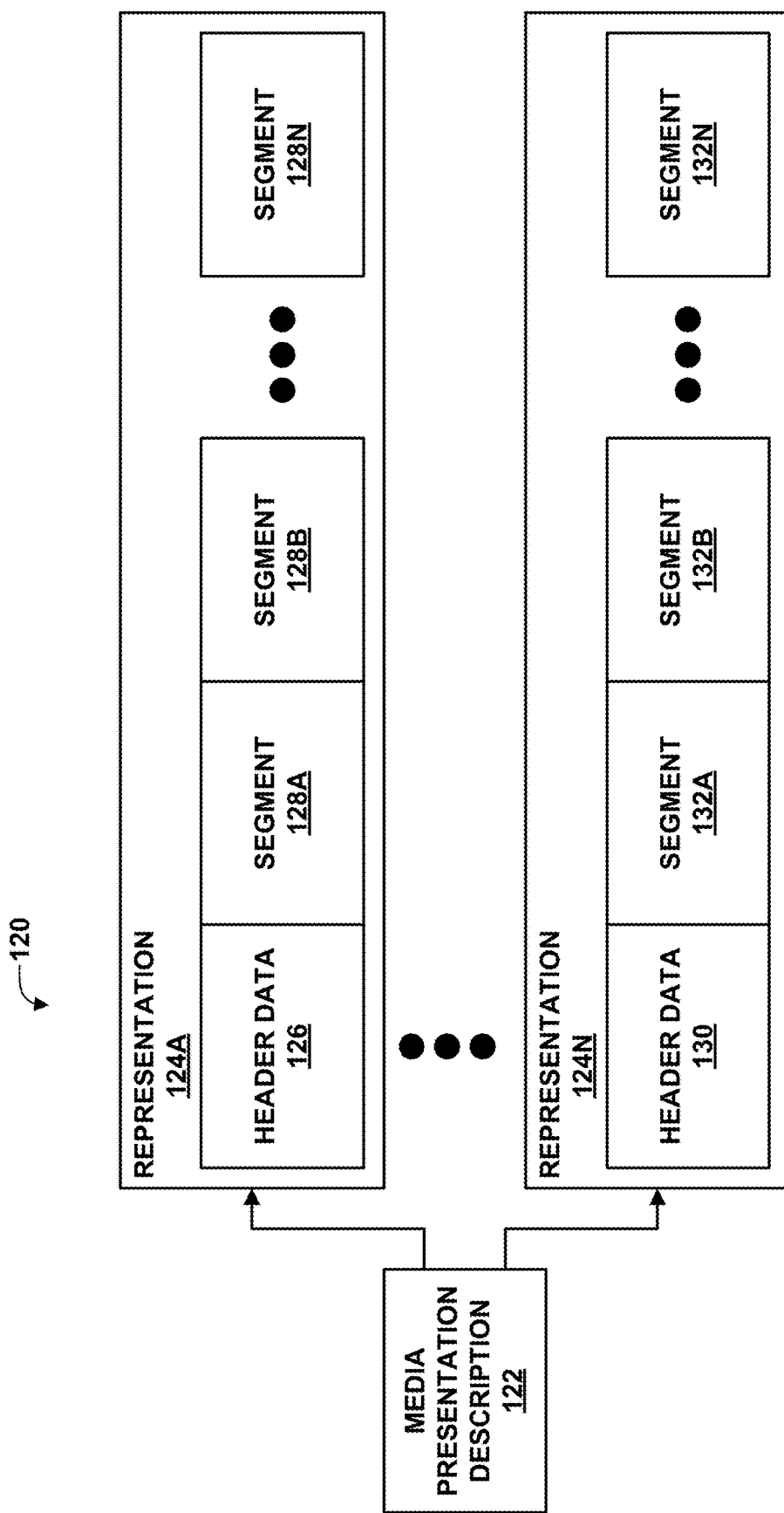
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

In accordance with the techniques of this disclosure, MPD 122 may include an initialization set, as discussed in greater detail below. The initialization set may specify initialization parameters that can be used to initialize playback of any of representations 124, that is, media data of any of segments 128, 132. For example, the initialization set may specify a maximum width and maximum height of pictures of representations 124 (that is, segments 128, 132). As another example, additionally or alternatively, the initialization set may specify a maximum frame rate for representations 124. Thus, each of representations 124 may have frame rates equal to or lower than the maximum frame rate. Likewise, each of representations 124 may include pictures having less than or equal to the maximum width and/or maximum height.

Figure 4:
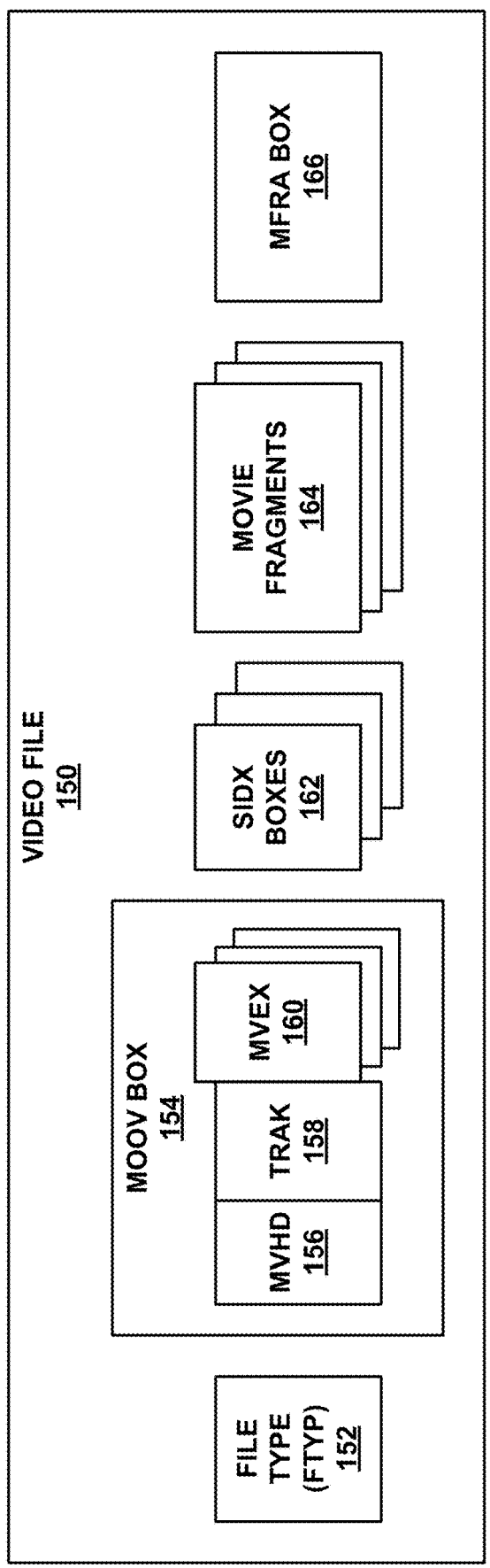
FIG. 4 is a block diagram illustrating elements of an example video file, which may correspond to a segment of a representation.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
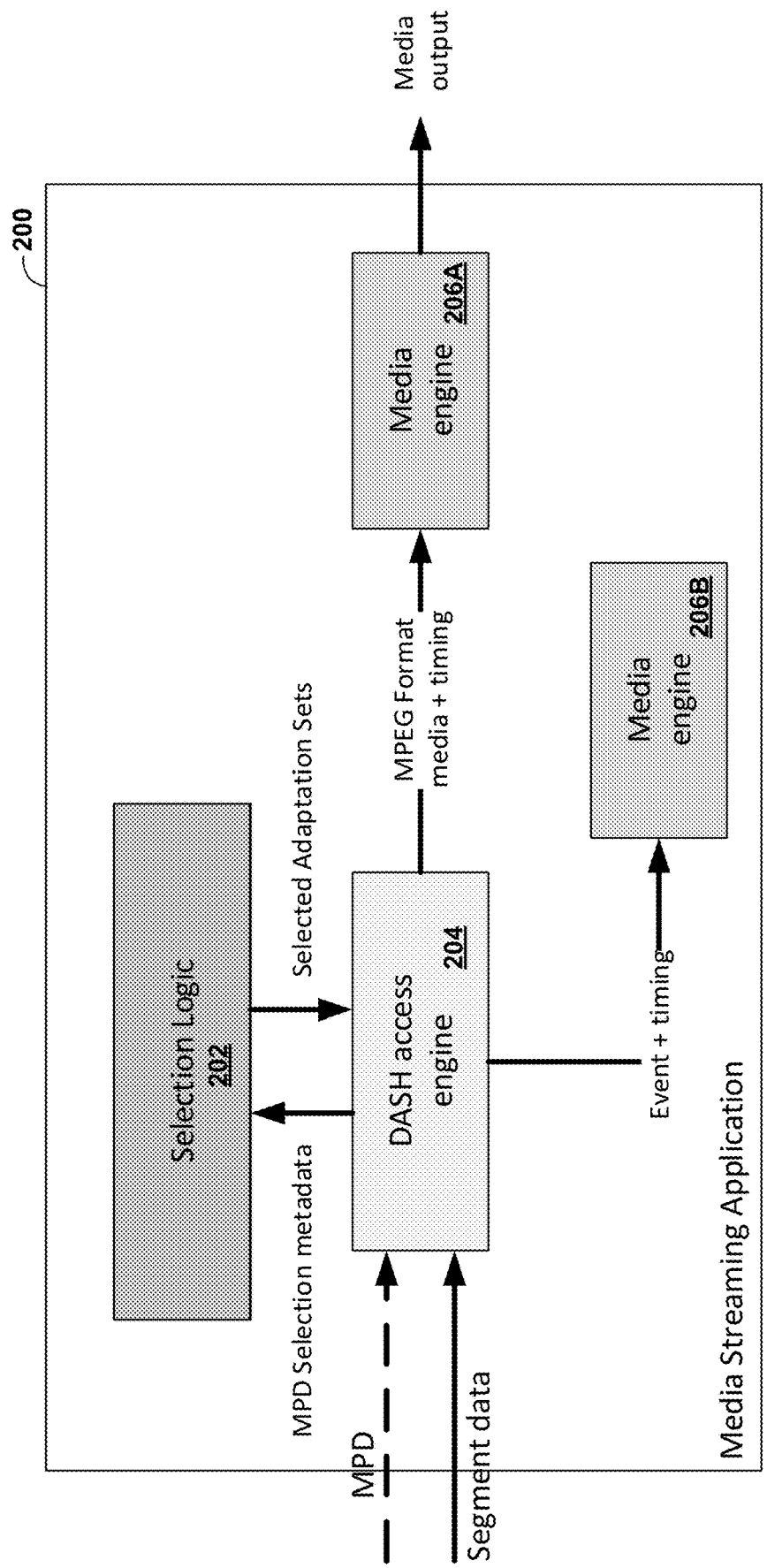
FIG. 5 is a conceptual diagram illustrating an example DASH client in accordance with the techniques of this disclosure.

FIG. 5 is a conceptual diagram illustrating example DASH client 200 in accordance with the techniques of this disclosure. DASH client 200 of FIG. 5 may correspond to or be included within retrieval unit 52 of FIG. 1 or DASH client 110 of FIG. 2. In this example, DASH client 200 includes selection logic 202, DASH access engine 204, and media engines 206A, 206B.

Among other organizations, DASH Industry Forum (DASH-IF) and Consumer Technology Association (CTA) Web Application Video Ecosystem (CTA WAVE) have discussed the topic of consistent playback of media based on a model as shown in FIG. 5, for which DASH access engine 204 establishes a media track buffer for each media type and segments are consumed in this environment. For example, the media types may include audio and video data, and thus, media engine 206A may process audio data, while media engine 206B may process video data.

An important topic is the ability to playback the presentation across program boundaries and for advertisement (ad) insertion without disrupting the playback experience. Two key issues have been observed. One issue corresponds to capability discovery if the media can be played back over the entire presentation, including across program boundaries. Another issue corresponds to the initialization and establishment of a track buffer/media pipeline for each media type that can be used for continuous playback of the media of one type for the entire presentation.

Amd.5 and TuC of DASH discuss several options to address the first issue regarding capability discovery noted above. In particular, the options include use of early available periods and/or use of a dedicated capability signaling that combines different features.

Figure 6:
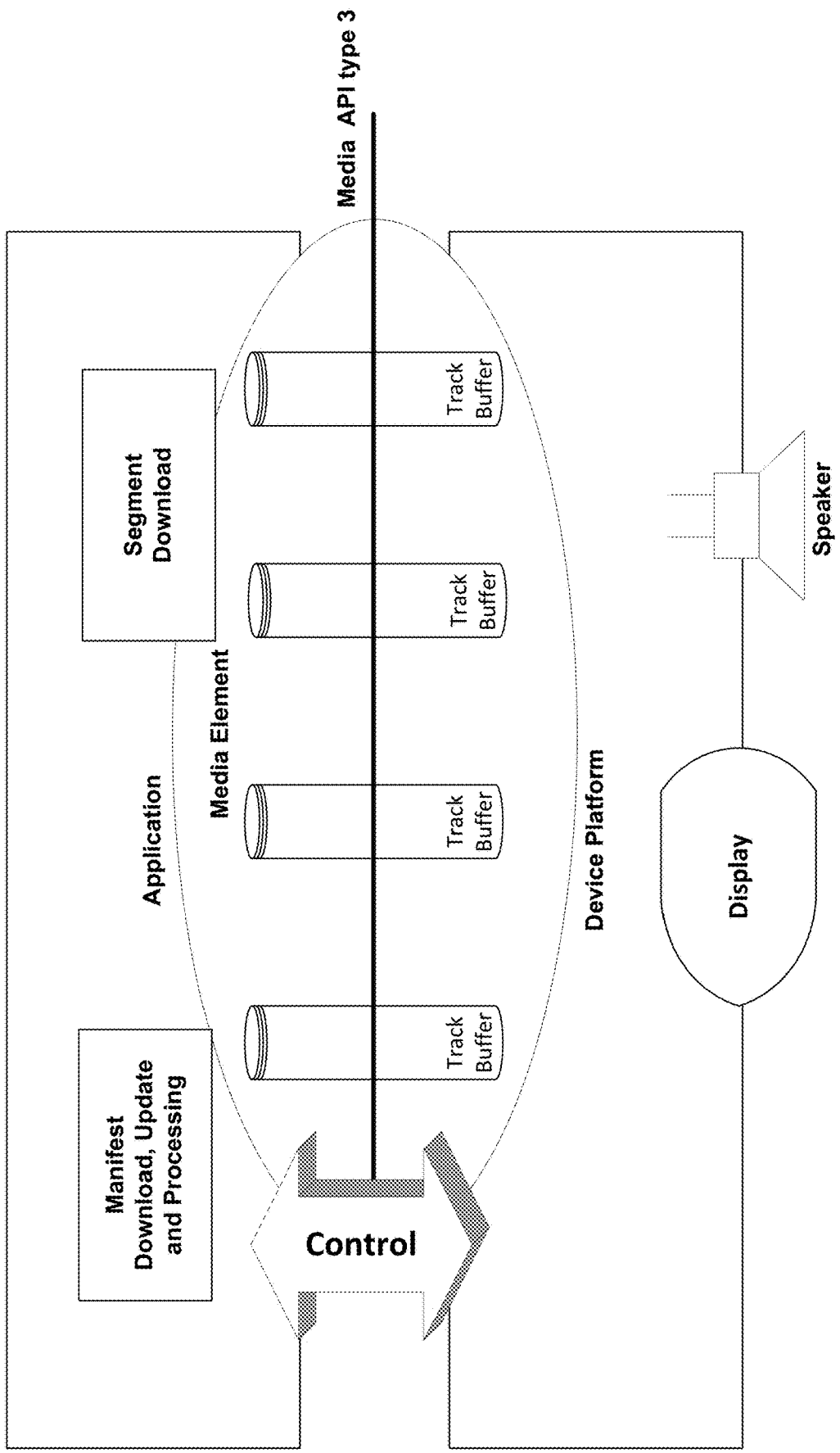
FIG. 6 is a conceptual diagram illustrating an example of track buffer-based playback.

FIG. 6 is a conceptual diagram illustrating an example of track buffer-based playback.

While a solution following the options discussed above may be sufficient to address the capability discovery aspect for playback of the entire presentation, it is still unclear if a DASH client can establish the playback of the media in a sufficiently good manner.

Typically, a device needs to establish at least a track buffer/media pipeline for a video media type and another track buffer/media pipeline for an audio media type. Track buffers/media pipelines for other media types, such as subtitles (timed text), may need to be established as well. A device may support the establishment of multiple source buffers for each media type.

A typical operation to establish such a source buffer is as follows:

Identifying the capability of a device to support handling of a specific media type, together with MIME sub-parameters.

If successful, initialize the source buffer appropriately with the relevant features Create a proper output environment for each established source buffer For video a pre-determined display window that matches the aspect ratio and
by default the size of the content (height and width), or as fullscreen mode possibly a using letter box, or an HDMI output.

For audio, usage of the output configuration of the speaker

As an example, the HTML-5 Media Element and the Media Source extension allows to add a source buffer using the MediaSource.addSourceBuffer(type) method. For details, see www.w3.org/TR/media-source/#dom-media-source-addsourcebuffer. For the case of the ISO BMFF byte stream format, the source buffer is further initialized by appending an Initialization Segment (IS) to the SourceBuffer by using the MediaSource.appendBuffer(IS). It is relevant that the initialization is done such that the playback of the remainder of the presentation can be done appropriately. Note that the source buffer may be updated/re-initialized by appending an IS to the SourceBuffer by using the MediaSource.appendBuffer(CH).

The techniques of this disclosure may be used to address the ability to specify initialization of media pipelines based on a global master initialization segment for each media type.

Figure 7:
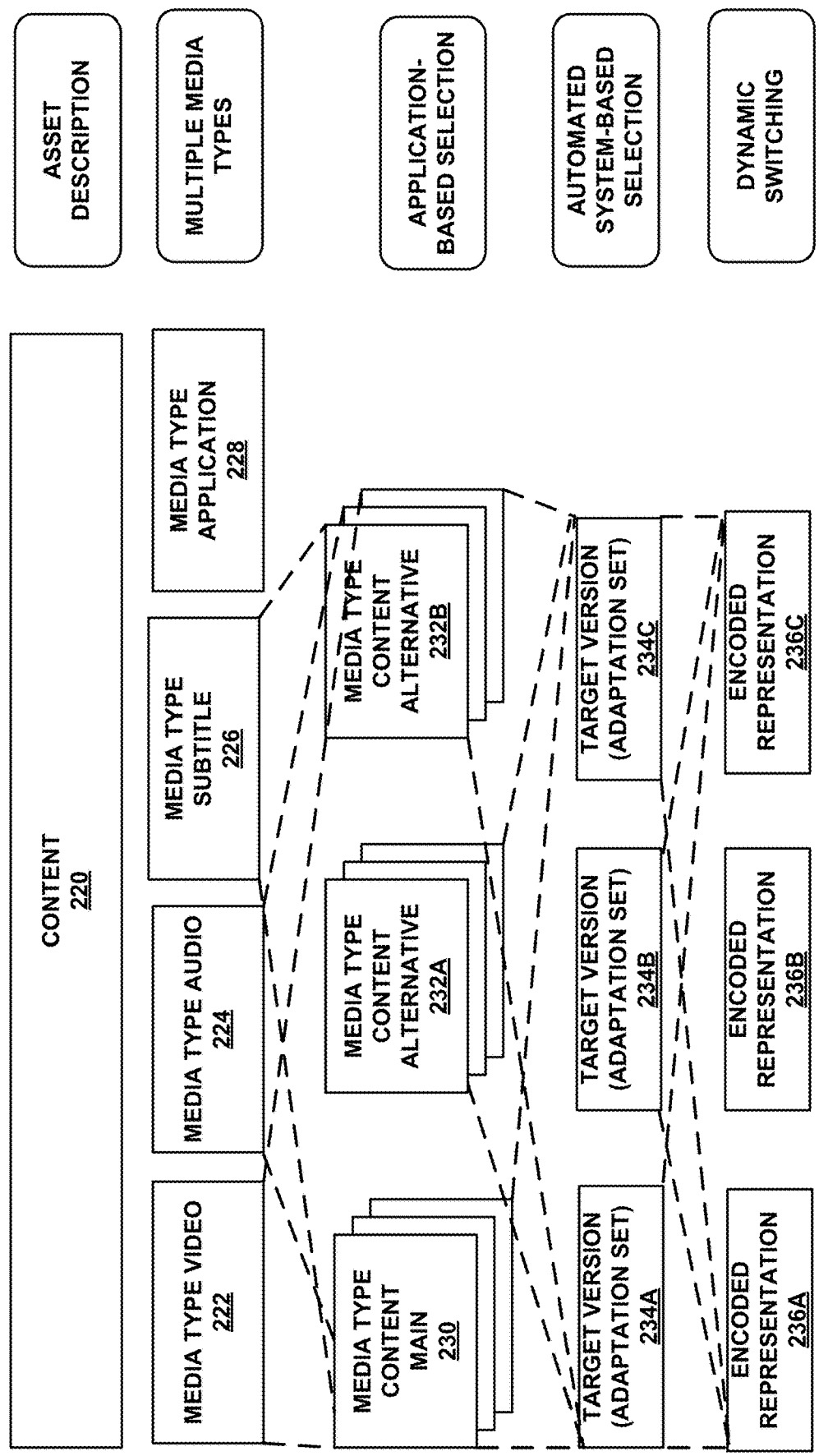
FIG. 7 is a conceptual diagram illustrating an example content model for DASH multitrack media data according to the techniques of this disclosure.

FIG. 7 is a conceptual diagram illustrating an example content model for DASH multitrack media data according to the techniques of this disclosure. In this example, content 220 includes media type video content 222, media type audio content 224, media type subtitle content 226, and media type application content 228. These media types may be arranged into a variety of content types, such as media type content main 230, media type content alternative 232A, and media type content alternative 232B. Each of the main and alternative contents may include content selected from one or more corresponding target version adaptation sets 234A-234C, including respective encoded representations such as representations 236A-236C.

In order to support the content author in providing content in a consistent manner, FIG. 7 provides a conceptual content model for DASH content 220 in one Period of an MPD according to DASH-IF IOPs v4.2. In an extension to the model of FIG. 7, for an entire MPD, an Initialization Set may be selected that provides a superset of multiple Adaptation Sets (adaptation sets 234) within a Period as well as across Periods. This Initialization Set, if selected, enables continuous playback across Period boundaries.

A source device (such as content preparation device 20 and/or server device 60 of FIG. 1) and a client device (such as client device 40 of FIG. 1 and/or DASH client 200 of FIG. 5) may be configured to use the techniques of this disclosure to use an initialization set that allows for continuous playback across period boundaries. In particular, these techniques include the following:

1. Manifest file (e.g., MPD) level signaling that enables selection of a proper Initialization Set including an Initialization Segment for the entire Media Presentation.

2. Provide an Initialization Segment within the selected Initialization Set that permits initialization of the media pipeline for a specific media type, including codec, decryption, and rendering environments.

3. Provide MPD signaling that permits identification of the Adaptation Sets and Representations that can be based on the selected Initialization Set.

4. Provide this signaling in a backward-compatible manner.

The Initialization Set may be defined in two example ways:

1. As a superset of all referencing Adaptation Sets.
2. As a pure initialization construct that focuses on media pipelines.

The semantics of the MPD element of the DASH specification may be updated to include an InitializationSet element, as shown in Table 1 below:

TABLE 1

| Element or Attribute Name | Use | Description |
|---|---|---|
| MPD | | The root element that carries the Media Presentation Description for a Media Presentation. |
| InitializationSet | 0 . . . N | specifies a suitable initialization for a specific media type for the presentation. If present, each Period of the Media Presentation shall include at least one Adaptation Set that can be played under when initialized by this Initialization Set. For details see clause 5.3.X |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @

Semantics for the Initialization Set element of the MPD (or other manifest file) may be defined as follows (where identified sections correspond to sections of the DASH standard):

5.3.X Initialization Set
5.3.X.1 Overview

An Initialization Set provides a common set of media properties across the Media Presentation. If an Initialization Set is provided in an MPD with certain properties, there shall be at least one Adaptation Set in each Period with the same properties in each Period. An Initialization Set may be selected at the start of a Media Presentation in order to establish the relevant decryption, decoding and rendering environment. Hence, Initialization Sets share all parameters of Adaptation Sets, but only in a Media Presentation an Adaptation Set may have additional information, for example:

There may be an Initialization Set with media type audio and a @codecs parameter, but without a @lang attribute. Then there may be Adaptation Sets with the same media type, the same @codecs parameter, but each of the Adaptation Set defines a language. This ensures that playback of the audio is possible, but changes may happen.

There may be an Initialization Set with media type video and @maxWidth and @maxHeight parameter and a @codecs parameter. Then there may be Adaptation Sets with the same media type, but the actually codecs parameters, width and height is different, but can be decoded and displayed within the Initialization Set constraints.

If an MPD has multiple Periods, there should be at least one Initialization Set be present for each media type.

The semantics of the attributes and elements within an InitializationSet element are provided in Table 5 of 5.3.X.2. The XML syntax of the InitializationSet element is provided in 5.3.X.3.

5.3.X.2 Semantics

TABLE 5

Semantics of AdaptationSet element

| Element or Attribute Name | Use | Description |
|---|---|---|
| InitializationSet | | Initialization Set description |
| @xlink:href | O | specifies a reference to a remote element entity that shall contain exactly one element of type InitializationSet |
| @xlink:actuate | OD default: 'onRequest' | specifies the processing instructions, which can be either "onLoad" or "onRequest". |
| @id | O | specifies a unique identifier for this Adaptation Set in the scope of the Period. The attribute shall be a unique unsigned integer value in the scope of the containing Period. The attribute shall not be present in a remote element entity. If not present, no identifier for the Adaptation Set is specified. |
| Common-AttributesElements | — | specifies the common attributes and elements (attributes and elements from base type RepresentationBaseType). For details see 5.3.7. |
| @contentType | O | specifies the media content component type for this Adaptation Set. A value of the top-level Content-type 'type' value as defined in IETF RFC 6838, Clause 4 shall be taken. If not present, the media content component type may be defined for each media component or it may be unknown. |
| @par | O | specifies the picture aspect ratio of the video media component type, in the form of a string consisting of two integers separated by ':', e.g., "16:9". When this attribute is present, and the attributes @width and @height for the set of Representations are also present, the picture aspect ratio as specified by this attribute shall be the same as indicated by the values of @width, @height, and @sar, i.e. it shall express the same ratio as (@width * sarx): (@height * sary), with sarx the first number in @sar and sary the second number. If not present, the picture aspect ratio may be defined for each media component or it may be unknown. |
| @maxWidth | O | specifies the maximum @width value in all Representations in all Adaptation Sets associated to this Initialization Set. This value has the same units as the @width attribute. If not present, the value is unknown. |

TABLE 5-continued

Semantics of AdaptationSet element

| Element or Attribute Name | Use | Description |
|---|---|---|
| @maxHeight | O | specifies the maximum @height value in all Representations in all Adaptation Sets associated to this Initialization Set. This value has the same units as the @height attribute. If not present, the value is unknown. |
| @maxFrameRate | O | specifies the maximum @framerate value in all Representations in all Adaptation Sets associated to this Initialization Set. This value is encoded in the same format as the @frameRate attribute. If not present, the value is unknown. |
| @initialization | O | specifies the URL an Initialization Segment. |
| Accessibility | 0 ... N | specifies information about accessibility scheme For more details, refer to 5.8.1 and 5.8.4.3. |
| Role | 0 ... N | specifies information on role annotation scheme For more details, refer to 5.8.1 and 5.8.4.2. |
| Rating | 0 ... N | specifies information on rating scheme. For more details, refer to 5.8.1 and 5.8.4.4. |
| Viewpoint | 0 ... N | specifies information on viewpoint annotation scheme. For more details, refer to 5.8.1 and 5.8.4.5. |

Legend:
For attributes: M = Mandatory, O = Optional, OD = Optional with Default Value, CM = Conditionally Mandatory, F = Fixed.
For elements: <minOccurs> ... <maxOccurs> (N = unbounded)
Note
that the conditions only holds without using xlink:href. If linking is used, then all attributes are "optional" and <minOccurs = 0>
Elements are bold; attributes are non-bold and preceded with an @, List of elements and attributes is in italics bold referring to those taken from the Base type that has been extended by this type.

5.3.X.3 XML Syntax

```
<!-- Adaptation Set -->
<xs:complexType name="InitializationSetType">
    <xs:complexContent>
        <xs:extension base="RepresentationBaseType">
            <xs:sequence>
                <xs:element name="Accessibility" type="DescriptorType" minOccurs="0" maxOccurs="unbounded"/>
                <xs:element name="Role" type="DescriptorType" minOccurs="0" maxOccurs="unbounded"/>
                <xs:element name="Rating" type="DescriptorType" minOccurs="0" maxOccurs="unbounded"/>
                <xs:element name="Viewpoint" type="DescriptorType" minOccurs="0" maxOccurs="unbounded"/>
                <xs:element name="ContentComponent" type="ContentComponentType" minOccurs="0" maxOccurs="unbounded"/>
            </xs:sequence>
            <xs:attribute ref="xlink:hrerf"/>
            <xs:attribute ref="xlink:actuate" default="onRequest"/>
            <xs:attribute name="id" type="xs:unsignedInt"/>
            <xs:attribute name="lang" type="xs:language"/>
            <xs:attribute name="contentType" type="IETF
```

-continued

```
        RFC6838ContentTypeType"/>
            <xs:attribute name="par" type="RatioType"/>
            <xs:attribute name="maxBandwidth" type="xs:unsignedInt"/>
            <xs:attribute name="maxWidth" type="xs:unsignedInt"/>
            <xs:attribute name="maxHeight" type="xs:unsignedInt"/>
            <xs:attribute name="maxFrameRate" type="FrameRateType"/>
        </xs:extension>
    </xs:complexContent>
</xs:complexType>
```

The following attribute may be added to the Adaptation Set element of the MPD:

| Element or Attribute Name | Use | Description |
|---|---|---|
| AdaptationSet | | Adaptation Set description |
| @initializationSetRef | O | Specifies a comma-separated list of Initialization set identifiers. The Adaptation Set is included in all Initialization Sets that are referenced. |

By providing the Initialization Set, the DASH client can select an Initialization that matches capabilities of a device including the DASH client and also can ensure continuous playback by initializing with the provided Initialization Segment. The techniques of this disclosure may also address the discussion on Early Available Period and provide a new capability mechanism as the relevant information is provided upfront.

Figure 8:
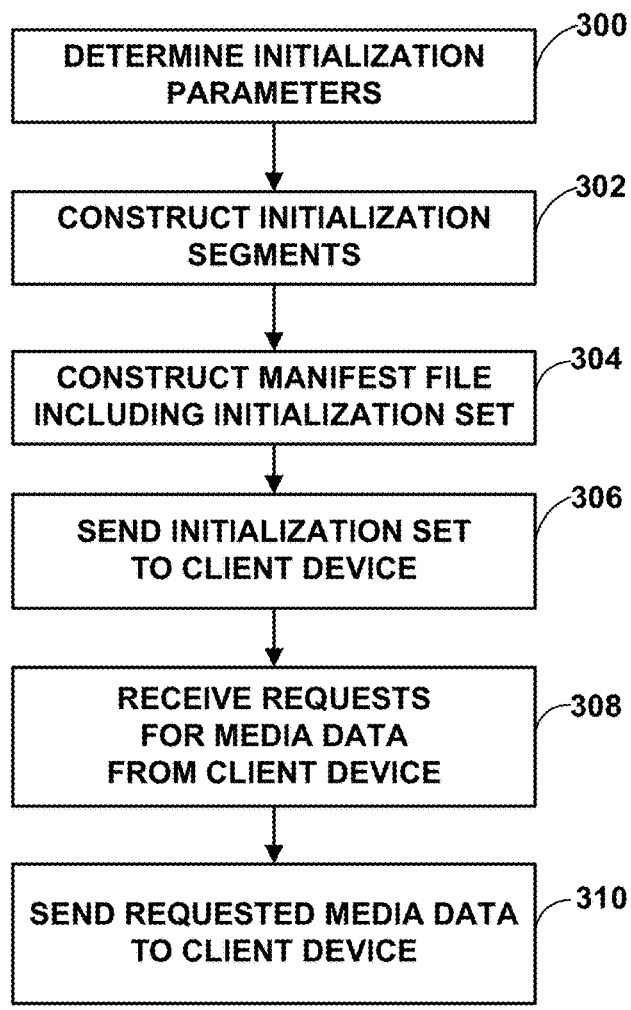
FIG. 8 is a flowchart illustrating an example method of sending media data according to the techniques of this disclosure.

FIG. 8 is a flowchart illustrating an example method of sending media data according to the techniques of this disclosure. For purposes of example, the method of FIG. 8 is explained with respect to content preparation device 20 of FIG. 1. However, it should be understood that other devices, such as server device 60 of FIG. 1, may be configured to perform this or a similar method, alone or in conjunction with other devices.

Initially, content preparation device 20 determines initialization parameters (300) for a media presentation, such as multimedia content 64. The initialization parameters may be used to initialize media data of any adaptation set and/or representation of the media presentation. For example, the initialization parameters may specify a maximum width and maximum height of pictures and/or a maximum framerate for the media presentation. The initialization parameters may also specify a picture aspect ratio for pictures of the media presentation.

Content preparation device 20 may then construct initialization segments (302) for the media presentation. Content preparation device 20 may construct the initialization segments for a variety of types of media, such as audio, video, timed text (closed captions), or the like. Content preparation device 20 may construct the initialization segments according to the initialization parameters determined above.

Content preparation device 20 may further construct a manifest file (such as a DASH MPD) including one or more initialization sets (304). Each of the initialization sets may conform to the initialization sets of Tables 1 and 5 above. As shown above, each initialization set may include an @maxWidth element specifying a maximum picture width, a @maxHeight element specifying a maximum picture height, and a @maxFrameRate element specifying a maximum frame rate. Content preparation device 20 may further specify URLs of the initialization segments in the initialization sets, e.g., in respective @initialization elements. Content preparation device 20 may construct one initialization set per adaptation set, and thereby construct one or more initialization sets per media type (e.g., audio, video, timed text, or the like). The initialization set may include an @contentType element specifying a media type for the initialization set (e.g., audio, video, timed text, or the like), as shown in Table 5.

Content preparation device 20 may then send the initialization sets to a client device (306). In particular, content preparation device 20 may send the manifest file to the client device, the manifest file including the initialization sets. As shown in FIG. 1, content preparation device 20 may send the manifest file to server device 60, which may send the manifest file to client device 40 in response to a request from client device 40 for the manifest file of a particular media presentation.

Content preparation device 20 may also receive requests for media data from the client device (308). Alternatively, server device 60 may receive the requests. In response to the requests, content preparation device 20 (or server device 60) may send the requested media data to the client device (310). In some examples, the client device (e.g., client device 40) may request media data from various representations for the same type of media content. However, client device 40 may only request the initializations segment for that type of media content once, since the initialization segment can be used to initialize playback of all media content of that type of the media presentation. In this manner, the techniques of this disclosure may be used to reduce a number of initialization segments sent to client device 40 by content preparation device 20 and/or server device 60. In this manner, these devices may avoid processing of requests for the initialization segments, and also reduce network bandwidth utilized in receiving requests for the initialization segments and sending the initialization segments to client device 40.

In this manner, the method of FIG. 8 represents an example of a method of sending media data including sending a manifest file for a media presentation to a client device, the manifest file including data for an initialization set, the initialization set including initialization parameters for the full duration of the media presentation; receiving a request for media data of the media presentation from the client device; and sending the requested media data to the client device.

Figure 9:
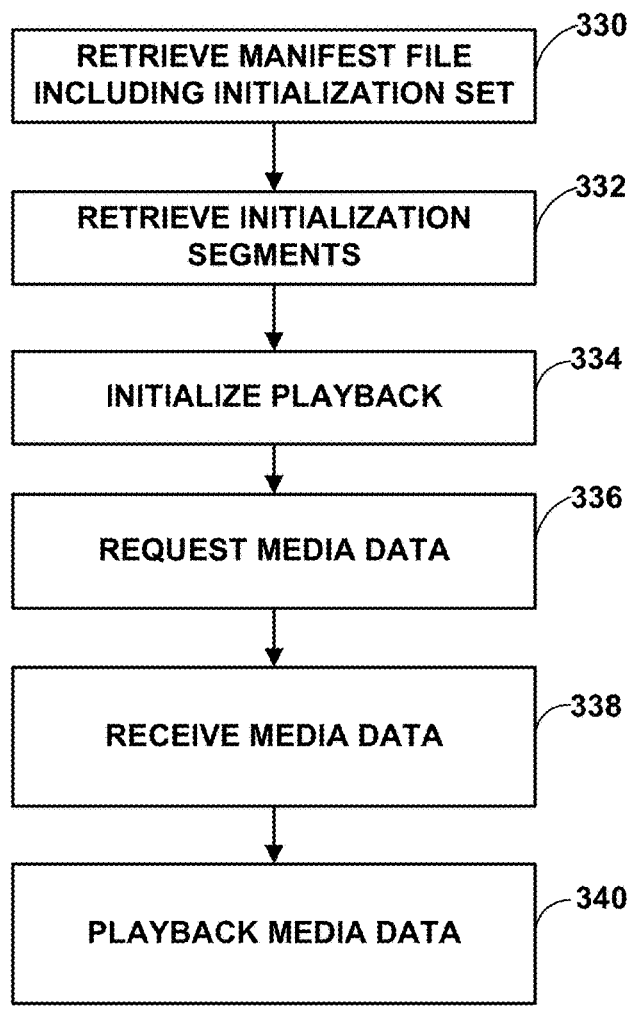
FIG. 9 is a flowchart illustrating an example method of retrieving media data according to the techniques of this disclosure.

FIG. 9 is a flowchart illustrating an example method of retrieving media data according to the techniques of this disclosure. For purposes of example and explanation, the method of FIG. 9 is explained with respect to client device 40 of FIG. 1. However, other devices may be configured to perform this or a similar method. For example, DASH client 200 of FIG. 5 may be configured to perform this method.

Initially, client device 40 may retrieve a manifest file including one or more initialization sets (330). An initialization set of the manifest file may specify initialization parameters such as, for example, a maximum width and maximum height of pictures, a picture aspect ration of the pictures, a maximum frame rate, or the like. The initialization set may also indicate a URL of a corresponding initialization segment. Thus, client device 40 may retrieve the initializations segments (332) for each of the initialization sets (and likewise, for each of the types of media content, e.g., audio, video, timed text, and the like).

Client device 40 may then use the initialization sets and initialization segments to initialize playback of the media data (334). Such initialization may be for decryption, decoding, and or rendering. For example, client device 40 may initialize a video decoder and a renderer according to the maximum height, maximum width, and maximum frame rate. Such initialization may include, for example, allocating buffer space in a buffer of a memory (e.g., cache 104) for storing retrieved media data and/or for storing intermediate media data, e.g., partially or fully decoded media data.

Client device 40 may then request media data (336), e.g., by issuing HTTP GET or partial GET requests for the media data. Client device 40 may then receive the media data (338) and playback the media data (340). In some examples, client device 40 may retrieve media data having the maximum specified parameters, e.g., maximum height, maximum width, maximum frame rate, etc. In some examples, client device 40 may retrieve media data having less than the maximum specified parameters. Client device 40 may retrieve media data having the maximum specified parameters for a first playback time and media data having less than the maximum specified parameters for a second, different playback time. However, client device 40 need not reinitialize playback of the media data having less than the maximum specified parameters, because the original initialization can be used for playback of any of the media data of the media presentation, since the initialization parameters either specify maximum or unchanging parameters.

In this manner, the method of FIG. 9 represents an example of a method of retrieving media data including retrieving a manifest file for a media presentation, the manifest file including data for an initialization set, the initialization set including initialization parameters for the full duration of the media presentation; initializing playback of media data of the media presentation using the initialization set; retrieving the media data of the media presentation; and presenting the media data according to the initialized playback.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising:
   retrieving a manifest file for a media presentation, the manifest file including initialization set data, the initialization set data including an initialization set including initialization parameters for the full duration of the media presentation;
   initializing playback of media data of the media presentation using the initialization set;
   retrieving the media data of the media presentation; and
   presenting the media data according to the initialized playback.

2. The method of claim 1, wherein the media presentation includes a plurality of periods, each of the periods including an adaptation set having a representation including media data that can be presented using the initialization parameters of the initialization set and the initialized playback, the method further comprising determining the representations of the periods including the media data that can be presented using the initialization parameters and the initialized playback using data of the manifest file.

3. The method of claim 2, wherein the manifest file includes an initialization set reference attribute in at least one of an adaptation set element or a representation element, the initialization set reference attribute indicating the initialization set that can be used to present the media data of the representations of the adaptation set.

4. The method of claim 1, wherein the initialization set includes data identifying initialization segments of one or more types of media of the media presentation.

5. The method of claim 4, wherein the data identifying the initialization segments comprises uniform resource locators (URLs) of the initialization segments.

6. The method of claim 4, wherein the one or more types of media comprise one or more of audio, video, or timed text.

7. The method of claim 1, wherein the initialization parameters specify one or more of a maximum width of pictures of the media presentation or a maximum height of the pictures of the media presentation, and wherein retrieving the media data comprises:
retrieving first media data of the media presentation for a first playback time, the first media data including pictures having at least one of the maximum width or the maximum height; and
retrieving second media data of the media presentation for a second playback time, the second playback time being different than the first playback time and the second media data being different than the first media data, and the second media data including pictures having less than the maximum width and the maximum height.

8. The method of claim 1, wherein the initialization parameters specify a maximum frame rate of the media presentation, and wherein retrieving the media data comprises:
retrieving first media data of the media presentation for a first playback time, the first media data having the maximum frame rate; and
retrieving second media data of the media presentation for a second playback time, the second playback time being different than the first playback time and the second media data being different than the first media data, and the second media data having less than the maximum frame rate.

9. The method of claim 1, wherein initializing the playback comprises initializing at least one of decryption, decoding, or rendering.

10. The method of claim 1, wherein the manifest file comprises a media presentation description (MPD) of Dynamic Adaptive Streaming over HTTP (DASH).

11. A device for retrieving media data, the device comprising:
a memory configured to store media data of a media presentation; and
one or more processors implemented in circuitry and configured to:
retrieve a manifest file for the media presentation, the manifest file including initialization set data, the initialization set data including an initialization set including initialization parameters for the full duration of the media presentation;
initialize playback of the media data of the media presentation using the initialization set;
retrieve the media data of the media presentation; and
present the media data according to the initialized playback.

12. The device of claim 11, wherein the media presentation includes a plurality of periods, each of the periods including an adaptation set having a representation including media data that can be presented using the initialization parameters of the initialization set and the initialized playback, the method further comprising determining the representations of the periods including the media data that can be presented using the initialization parameters and the initialized playback using data of the manifest file.

13. The device of claim 11, wherein the initialization set includes uniform resource locators (URLs) of initialization segments of one or more types of media of the media presentation.

14. The device of claim 11, wherein the initialization parameters specify one or more of a maximum width of pictures of the media presentation or a maximum height of the pictures of the media presentation, and wherein to retrieve the media data, the one or more processors are configured to:
retrieve first media data of the media presentation for a first playback time, the first media data including pictures having at least one of the maximum width or the maximum height; and
retrieve second media data of the media presentation for a second playback time, the second playback time being different than the first playback time and the second media data being different than the first media data, and the second media data including pictures having less than the maximum width and the maximum height.

15. The device of claim 11, wherein the initialization parameters specify a maximum frame rate of the media presentation, and wherein to retrieve the media data, the one or more processors are configured to:
retrieve first media data of the media presentation for a first playback time, the first media data having the maximum frame rate; and
retrieve second media data of the media presentation for a second playback time, the second playback time being different than the first playback time and the second media data being different than the first media data, and the second media data having less than the maximum frame rate.

16. A non-transitory computer-readable storage medium having stored thereon instructions that, when executed, cause a processor to:
retrieve a manifest file for a media presentation, the manifest file including initialization set data, the initialization set data including an initialization set including initialization parameters for the full duration of the media presentation;
initialize playback of media data of the media presentation using the initialization set;
retrieve the media data of the media presentation; and
present the media data according to the initialized playback.

17. The non-transitory computer-readable storage medium of claim 16, wherein the media presentation includes a plurality of periods, each of the periods including an adaptation set having a representation including media data that can be presented using the initialization parameters of the initialization set and the initialized playback, the method further comprising determining the representations of the periods including the media data that can be presented using the initialization parameters and the initialized playback using data of the manifest file.

18. The non-transitory computer-readable storage medium of claim 16, wherein the initialization parameters specify one or more of a maximum width of pictures of the media presentation or a maximum height of the pictures of the media presentation, and wherein the instructions that cause the processor to retrieve the media data comprise instructions that cause the processor to:

retrieve first media data of the media presentation for a first playback time, the first media data including pictures having at least one of the maximum width or the maximum height; and retrieve second media data of the media presentation for a second playback time, the second playback time being different than the first playback time and the second media data being different than the first media data, and the second media data including pictures having less than the maximum width and the maximum height.

19. The non-transitory computer-readable storage medium of claim 16, wherein the initialization parameters specify a maximum frame rate of the media presentation, and wherein the instructions that cause the processor to retrieve the media data comprise instructions that cause the processor to:

retrieve first media data of the media presentation for a first playback time, the first media data having the maximum frame rate; and retrieve second media data of the media presentation for a second playback time, the second playback time being different than the first playback time and the second media data being different than the first media data, and the second media data having less than the maximum frame rate.

20. A device for retrieving media data, the device comprising:

means for retrieving a manifest file for a media presentation, the manifest file including initialization set data, the initialization set data including an initialization set including initialization parameters for the full duration of the media presentation;

means for initializing playback of media data of the media presentation using the initialization set;

means for retrieving the media data of the media presentation; and means for presenting the media data according to the initialized playback.

21. A method of sending media data, the method comprising:

sending a manifest file for a media presentation to a client device, the manifest file including initialization set data, the initialization set data including an initialization set including initialization parameters for the full duration of the media presentation;

receiving a request for media data of the media presentation from the client device; and sending the requested media data to the client device.

22. The method of claim 21, wherein the media presentation includes a plurality of periods, each of the periods including an adaptation set having a representation including media data that can be initialized and presented using the initialization parameters of the initialization set.

23. The method of claim 22, wherein the manifest file includes an initialization set reference attribute in at least one of an adaptation set element or a representation element, the initialization set reference attribute indicating the initialization set that can be used to present the media data of the representations of the adaptation set.

24. The method of claim 21, wherein the initialization set includes data identifying initialization segments of one or more types of media of the media presentation.

25. The method of claim 24, wherein the data identifying the initialization segments comprises uniform resource locators (URLs) of the initialization segments.

26. The method of claim 24, wherein the one or more types of media comprise one or more of audio, video, or timed text.

27. The method of claim 21, wherein the initialization parameters specify one or more of a maximum width of pictures of the media presentation or a maximum height of the pictures of the media presentation, and wherein sending the requested media data comprises:

sending first media data of the media presentation for a first playback time, the first media data including pictures having at least one of the maximum width or the maximum height; and sending second media data of the media presentation for a second playback time, the second playback time being different than the first playback time and the second media data being different than the first media data, and the second media data including pictures having less than the maximum width and the maximum height.

28. The method of claim 21, wherein the initialization parameters specify a maximum frame rate of the media presentation, and wherein sending the media data comprises:

sending first media data of the media presentation for a first playback time, the first media data having the maximum frame rate; and sending second media data of the media presentation for a second playback time, the second playback time being different than the first playback time and the second media data being different than the first media data, and the second media data having less than the maximum frame rate.

29. A device for sending media data, the device comprising:

a memory for storing media data of a media presentation; and one or more processors implemented in circuitry and configured to:

send a manifest file for the media presentation to a client device, the manifest file including initialization set data, the initialization set data including an initialization set including initialization parameters for the full duration of the media presentation;

receive a request for media data of the media presentation from the client device; and send the requested media data to the client device.

30. The device of claim 29, wherein the media presentation includes a plurality of periods, each of the periods including an adaptation set having a representation including media data that can be initialized and presented using the initialization parameters of the initialization set.

31. The device of claim 29, wherein the initialization set includes uniform resource locators (URLs) of initialization segments of one or more types of media of the media presentation.

32. The device of claim 29, wherein the initialization parameters specify one or more of a maximum width of pictures of the media presentation or a maximum height of the pictures of the media presentation, and wherein to send the requested media data, the one or more processors are configured to:

send first media data of the media presentation for a first playback time, the first media data including pictures having at least one of the maximum width or the maximum height; and send second media data of the media presentation for a second playback time, the second playback time being different than the first playback time and the second media data being different than the first media data, and the second media data including pictures having less than the maximum width and the maximum height.

33. The device of claim 29, wherein the initialization parameters specify a maximum frame rate of the media presentation, and wherein to send the media data, the one or more processors are configured to:
- send first media data of the media presentation for a first playback time, the first media data having the maximum frame rate; and
- send second media data of the media presentation for a second playback time, the second playback time being different than the first playback time and the second media data being different than the first media data, and the second media data having less than the maximum frame rate.

34. A non-transitory computer-readable storage medium having stored thereon instructions that, when executed, cause a processor to:
- send a manifest file for a media presentation to a client device, the manifest file including initialization set data, the initialization set data including an initialization set including initialization parameters for the full duration of the media presentation;
- receive a request for media data of the media presentation from the client device; and
- send the requested media data to the client device.

35. The non-transitory computer-readable storage medium of claim 34, wherein the media presentation includes a plurality of periods, each of the periods including an adaptation set having a representation including media data that can be initialized and presented using the initialization parameters of the initialization set.

36. The non-transitory computer-readable storage medium of claim 34, wherein the initialization set includes uniform resource locators (URLs) of initialization segments of one or more types of media of the media presentation.

37. The non-transitory computer-readable storage medium of claim 34, wherein the initialization parameters specify one or more of a maximum width of pictures of the media presentation or a maximum height of the pictures of the media presentation, and wherein the instructions that cause the processor to send the requested media data comprise instructions that cause the processor to:
- send first media data of the media presentation for a first playback time, the first media data including pictures having at least one of the maximum width or the maximum height; and
- send second media data of the media presentation for a second playback time, the second playback time being different than the first playback time and the second media data being different than the first media data, and the second media data including pictures having less than the maximum width and the maximum height.

38. The non-transitory computer-readable storage medium of claim 34, wherein the initialization parameters specify a maximum frame rate of the media presentation, and wherein the instructions that cause the processor to send the media data comprise instructions that cause the processor to:
- send first media data of the media presentation for a first playback time, the first media data having the maximum frame rate; and
- send second media data of the media presentation for a second playback time, the second playback time being different than the first playback time and the second media data being different than the first media data, and the second media data having less than the maximum frame rate.

39. A device for sending media data, the device comprising:
- means for sending a manifest file for a media presentation to a client device, the manifest file including initialization set data, the initialization set data including an initialization set including initialization parameters for the full duration of the media presentation;
- means for receiving a request for media data of the media presentation from the client device; and
- means for sending the requested media data to the client device.

* * * * *